United States Patent [19]

Ashworth

[11] Patent Number: 4,600,184
[45] Date of Patent: Jul. 15, 1986

[54] TOOL FENCE

[75] Inventor: Steven W. Ashworth, Blue Springs, Miss.

[73] Assignee: Delta International Machinery Corp., Pittsburgh, Pa.

[21] Appl. No.: 573,257

[22] Filed: Jan. 23, 1984

[51] Int. Cl.$^4$ ............................................. B23Q 3/02
[52] U.S. Cl. ................................. 269/303; 269/307; 269/315
[58] Field of Search .............................. 269/303–307, 269/315–320; 144/253 R; 83/438

[56] References Cited

U.S. PATENT DOCUMENTS

| | | | |
|---|---|---|---|
| 1,853,442 | 4/1932 | Mann | 144/253 R |
| 1,938,548 | 12/1933 | Tautz. | |
| 2,075,282 | 3/1937 | Hedgpeth. | |
| 2,097,920 | 11/1937 | Hedgpeth. | |
| 2,273,715 | 2/1942 | Lonskey et al. | |
| 2,651,337 | 9/1953 | Pollak | 83/438 |
| 2,677,400 | 5/1954 | Gaskell | 83/438 |
| 2,764,190 | 9/1956 | Howard. | |
| 2,808,084 | 10/1957 | Eschenburg. | |
| 4,174,100 | 11/1979 | Estess. | |
| 4,206,910 | 10/1981 | Biesemeyer. | |
| 4,294,151 | 10/1981 | Lemus. | |
| 4,322,066 | 3/1982 | Disney. | |

*Primary Examiner*—Frederick R. Schmidt
*Assistant Examiner*—Steven P. Schad
*Attorney, Agent, or Firm*—Merchant, Gould, Smith, Edell, Welter & Schmidt

[57] ABSTRACT

A fence assembly for a tilting arbor table saw is provided in which a fence is detachably mounted on a fence carrier in either one of the two selected positions to present either a comparatively tall or a comparatively short work guiding surface and for use on either the left or the righthand side of the cutting blade. The fence carrier is mounted on an elongated guide that is attached to the saw table and which has front walls that define a slot running along the length thereof. A locking mechanism is provided on the fence carrier that includes a locking element located within the elongated guide that can be rotated between a position where it secures the fence carrier against movement and a position where the element can be removed through the slot in the front wall to dismount the fence and fence carrier from the elongated guide.

6 Claims, 8 Drawing Figures

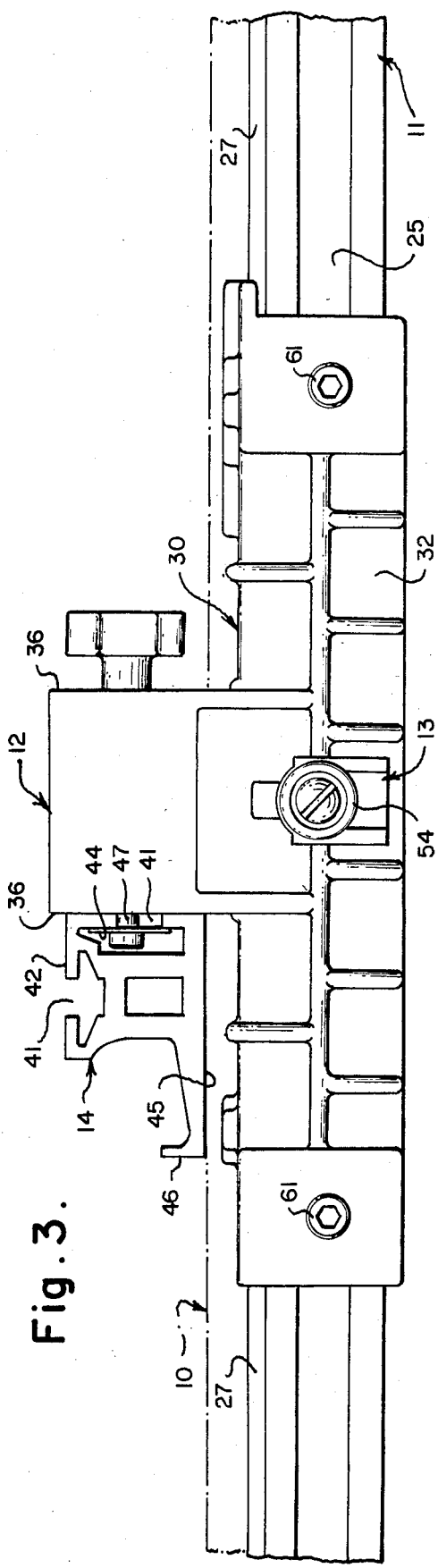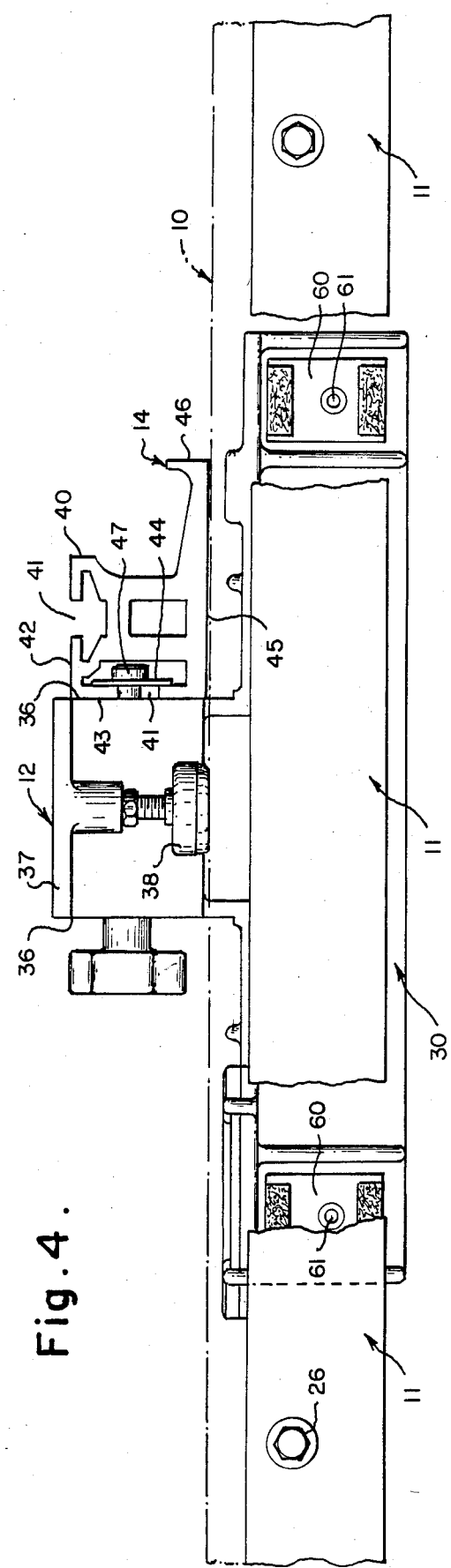

Fig. 5.
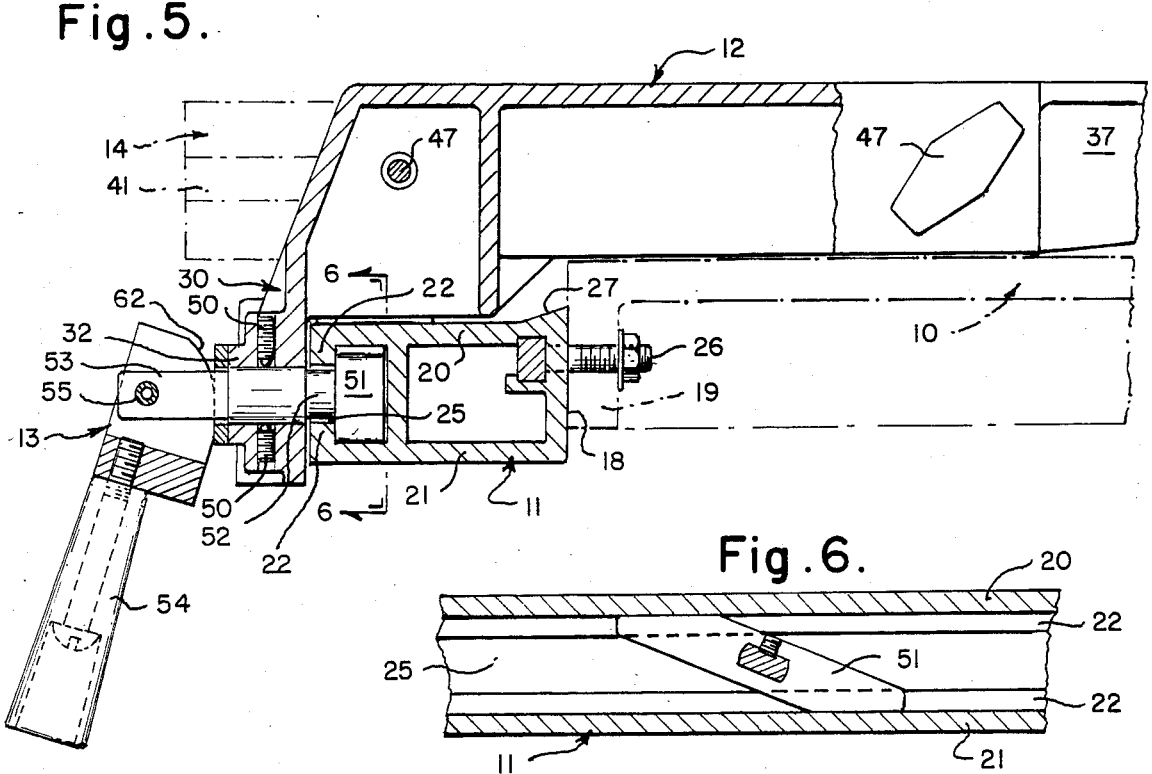
Fig. 6.
Fig. 7.
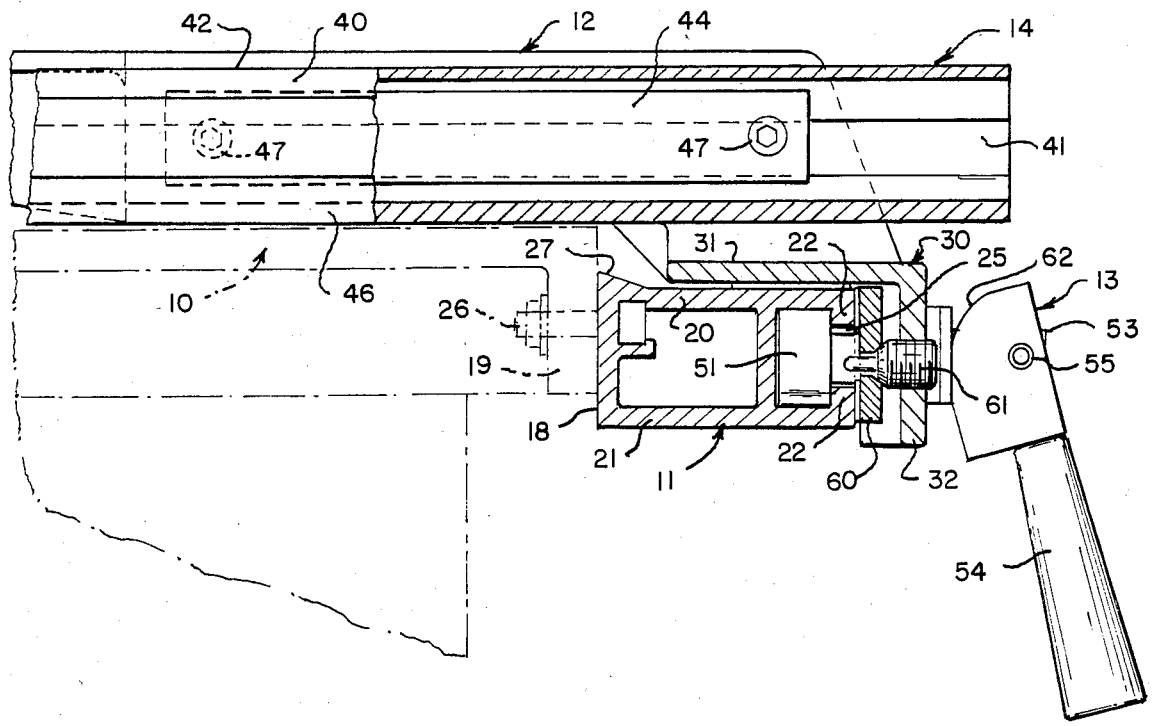

TOOL FENCE

BACKGROUND OF THE INVENTION

Field of the Invention

The present invention relates to a fence and to a fence mounting arrangement for use on a circular, tilting arbor table saw. Rip fences have long been used on table saws for providing a fixed guide against which the wood work piece can be held during the ripping operation. Generally, prior art guides have comprised an elongated fence having two opposed, parallel faces that extend across the saw table from the front to the rear. The fences have themselves then been secured either solely to a guide bar attached to and extending parallel to the front of the table or to guide bars secured to both the front and back of the saw table. Commonly, the front guide bar would have a measuring scale so that the operator could ascertain the distance between the fence and the cutting blade. Such fence constructions were, however, often deficient in that true parallelism between the fence and the blade was not maintained when the fence was moved between cutting positions. Further, when it became desirable to remove the fence arrangement from the table, such as, for example, when moving it from one side of the blade to the other, it was necessary to move it the entire length of the mounting guide bar in order to effect such removal.

One fence system which did improve the reliability of maintaining parallelism when changing fence positions is that described in U.S. Pat. No. 4,206.910. In this system, an elongated fence having parallel surfaces extending across the saw table is attached to an elongated shoe carried on a mounting rail that is secured to a bracket that is in turn secured to a bracket on the saw table. The shoe contains an adjusting pad adjacent each outer end and a cam operated clamping shoe midway between the pads to obtain a three-point clamping arrangement. By disengaging the cam, the entire shoe and fence can be removed from the end of the mounting rail.

SUMMARY OF THE INVENTION

It is a principal object of the invention to provide an improved fence assembly having both an improved fence per se and an improved construction for mounting the fence for movement on the saw table.

Another object of this invention is to provide a saw fence which can be mounted in two operative positions which provide work backing surfaces of different heights.

A further object of this invention is to provide a saw fence which is mounted in a manner permittng transverse positioning thereof, with respect to the saw table, whereby cross-cutting of short pieces can be performed safely.

An additional object of this invention is to provide an improved fence assembly which utilizes an elongated guide rail having a longitudinal slot along the front wall thereof.

Yet another object of this invention is to provide an improved fence assembly and to provide improved fence carrier subassembly which permits the fence to be attached to opposite sides thereof.

Still another object of this invention is to provide an improved fence assembly which has an elongated base portion that is carried on an elongated guide rail and is attached thereto by mechanism that permits the fence assembly to be removed at any location along the length of the guide rail.

Yet an additional object of this invention is to provide an improved fence assembly which includes an elongated guide rail having an upwardly and rearwardly directed portion on its upper surface which cooperates with a sliding cursor for setting distances between a saw blade and the fence with basic elimination of parallax.

BRIEF DESCRIPTION OF THE DRAWINGS

Additional objects and advantages of this invention will be part obvious and in part explained by reference to the accompanying specifications and drawings in which:

FIG. 3 is an enlarged front elevation of FIG. 1 with portions of the guide rail broken off;

FIG. 4 is an enlarged rear elevation of FIG. 1 with portions of the saw table removed to illustrate the alignment pads;

FIG. 5 is a right side partially sectioned elevational view showing the construction of the guide rail and the positioning of the locking mechanism;

FIG. 6 is a section of a portion of the guide rail taken along the line 6—6 of FIG. 5;

FIG. 7 is a left side partially sectioned elevational view of the fence assembly.

As mentioned above, the improved fence assembly described herein provides accuracy, reliability, ease of operation and versatility that have not existed in prior art fences. It should be pointed out that this fence assembly basically comprises four essential parts. These parts are (1) an elongated guide rail which is secured to the front of the table saw, (2) a fence carrier subassembly which is mounted upon the elongated guide rail, (3) a fence per se which is attached to the fence carrier subassembly and finally, (4) locking mechanism which is used to prevent movement of the fence carrier subassembly at any selected location.

Figure 1:
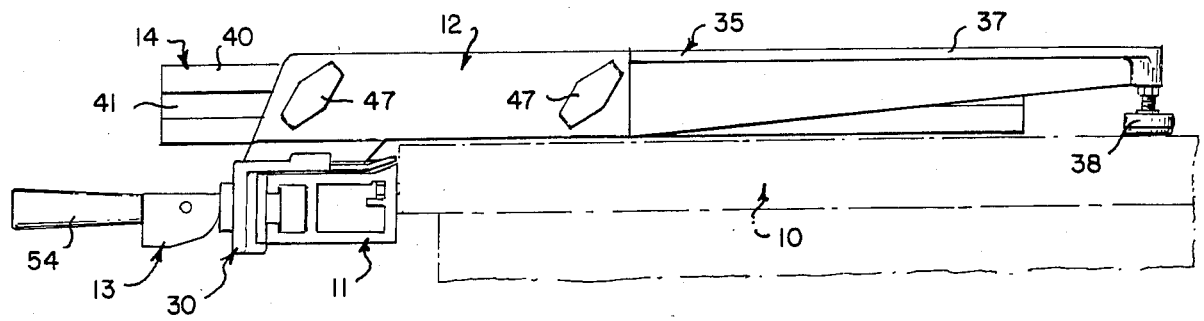
FIG. 1 is a right side elevation of the fence assembly as attached to a saw table that is indicted by broken lines.
Figure 2:
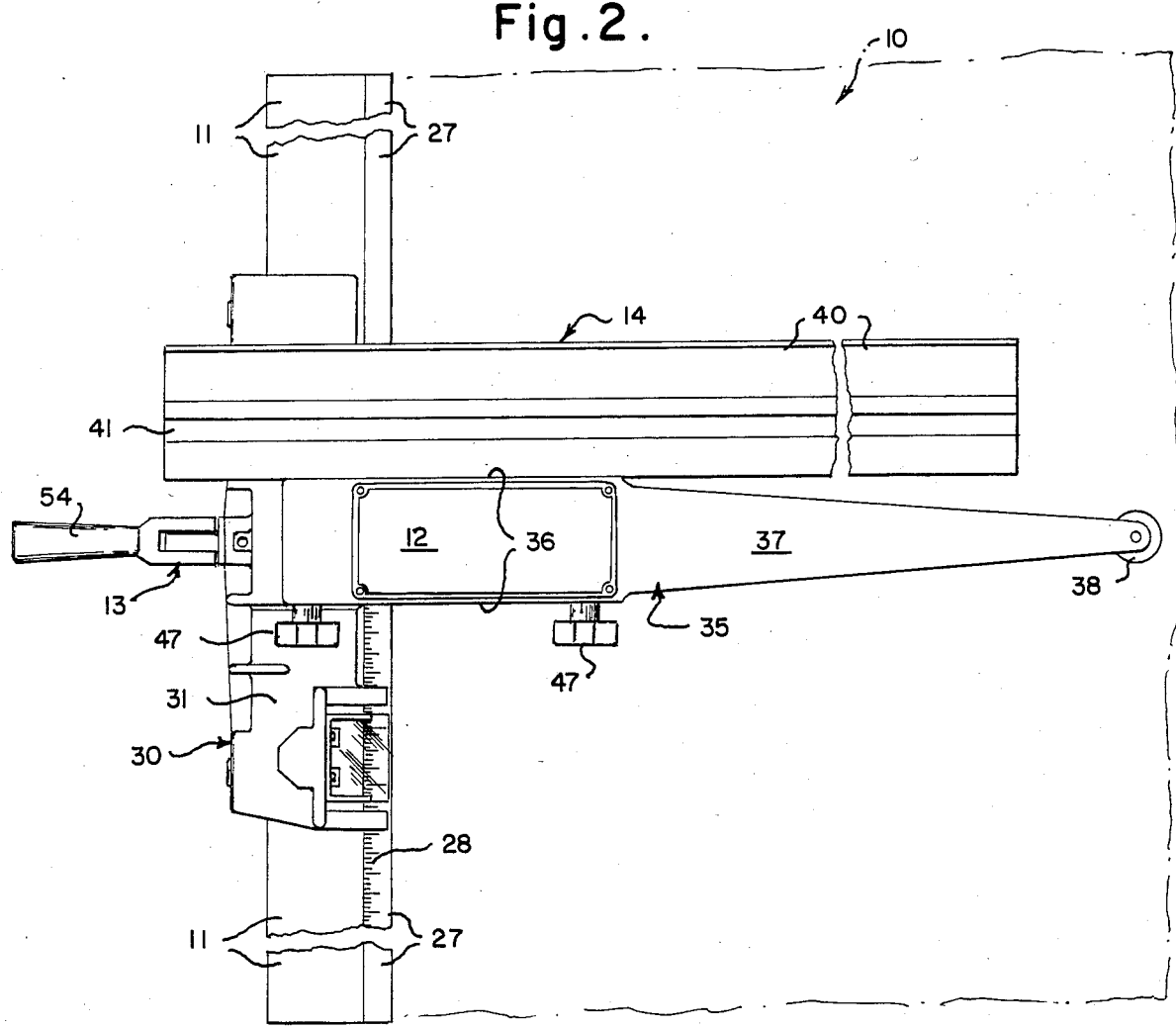
FIG. 2 is a top plan view of FIG. 1.

For a better understanding of the invention, reference is made to the drawings and špecically to FIGS. 1 and 2 wherein the numeral 10 is used to designate the work table of the tilting arbor table saw. The elongated guide rail identified by the numeral 11, extends parallel to and is mounted on the front edge of table 10. Numeral 12 is used to identify the fence carrier subassembly while the numeral 13 identifies the fence carrier locking subassembly in its mounted position in guide rail 11. Finally, numeral 14 is used to designate the fence itself, the fence extending generally parallel to that portion of the fence carrier subassembly that extends transversely across the surface of table 10 from front to back or from left to right as viewed in FIG. 2.

Figure 8:
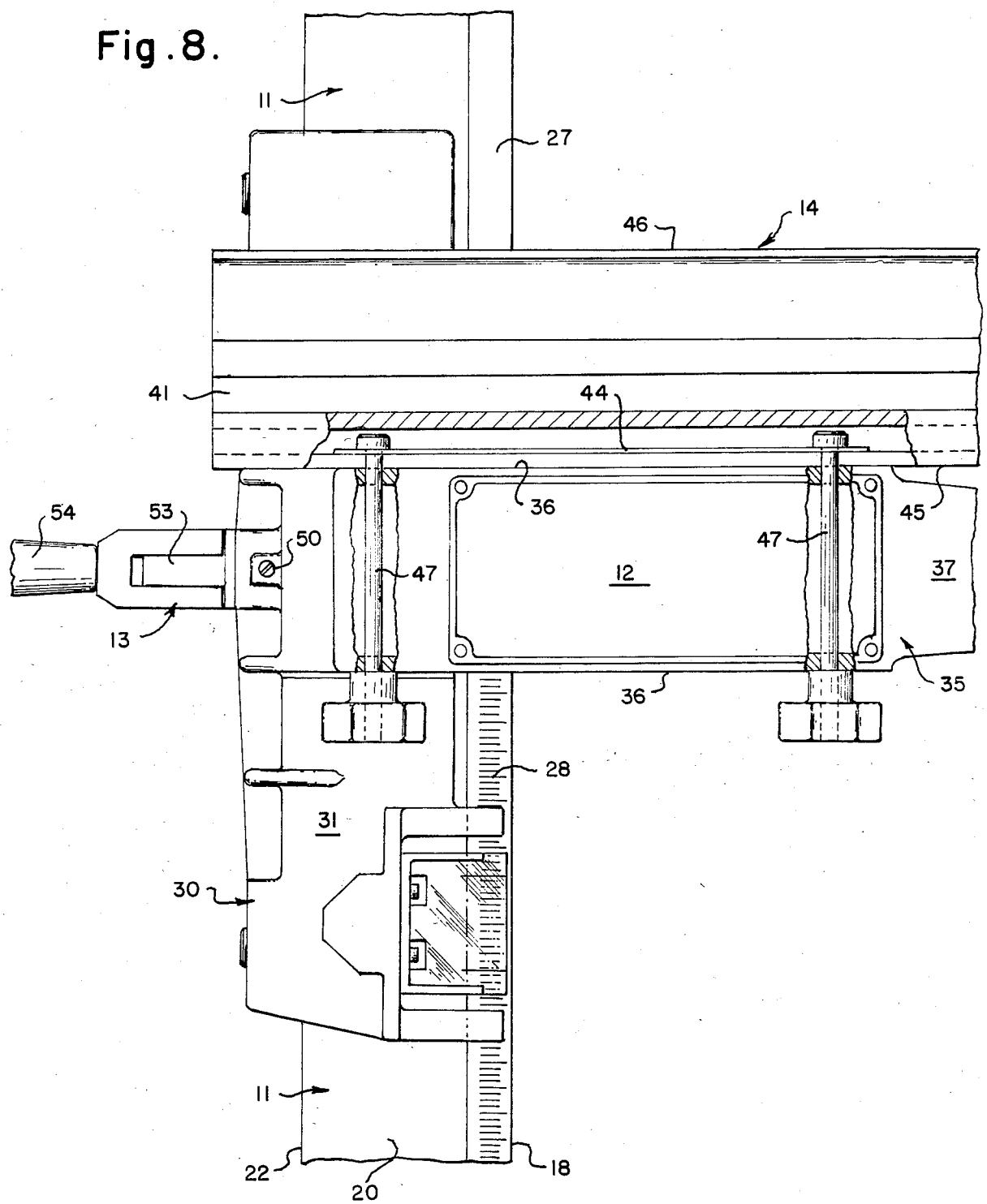
FIG. 8 is a top plan view of a portion of the fence mounting assembly, with parts broken away to illustrate mounting of the fence on the fence carrier subassembly.

Referring again to the drawings, and more specifically to FIGS. 5 and 7, a more detailed explanation of guide rail 11 will now be presented. Guide rail 11 is made up of a rear wall 18 which extends along the front of the downwardly extending flange 19 of table 10. Guide rail 11 further includes an upper wall 20 that extends substantially horizontally outward from rear wall 18 and therefore away from the flange 19 of table 10. Guide rail 11 further comprises a bottom wall 21 that also extends substantially horizontally outwardly from rear wall 18 and is generally parallel to upper wall 20. Finally, there are provided a pair of spaced part front walls 22 that extend inwardly toward each other in a direction which is generally normal to the upper and lower walls 20 and 21. The pair of spaced front walls 22 define between them a slot 25 (see FIG. 7) which extends along at least a portion of a length of guide rail 11. Guide rail 11 is secured to flange 19 of table 10 by means of threaded fasteners 26. Guide rail 22 includes an upwardly and rearwardly extending angled portion 27 on which a suitable measuring scale 28 (see FIGS. 2 and 8) is placed to enable determination of the distance between the fence and the blade that is used for the cutting operations.

The second part of the overall fence assembly to be discussed is the fence carrier subassembly 12 which is generally made up of an elongated base portion 30 that has an upper wall 31 mounted in sliding engagement with the upper wall 20 of guide rail 11 and a front wall 32 that extends downwardly from upper wall 31 and is mounted in sliding engagement with the front walls 22 of guide rail 11. Suitable friction reducing pads (not shown) may be included on the lower side of upper wall 31 so that the base portion 30 is free for movement across the length of upper wall 20 of rail 11. Front wall 32 of base portion 30 has a pair of adjusting pads 60 located toward the outer end thereof. Each pad 60 has a set screw 61 extending through it so that the base portion 30 can be kept in parallel with rail 11 by merely advancing or reversing the screws.

Extending outwardly from the base portion 30 is a fence receiving member 35 that extends in a direction substantially normal to the longitudinal direction of base member 30. The fence receiving portion 35 in fact extends outwardly in a transverse direction across table 10 or from left to right as viewed in FIG. 2. The fence receiving member also includes two flat parallel surfaces 36 on opposite sides so that the fence can be mounted on either side of the fence receiving member, depending on whether a left side or a right side cut is to be made on the workpiece. Finally, the fence receiving member 35 includes an outwardly extending leg portion 37 which decreases in width as it extends away from the parallel surfaces 36 toward the rear of saw table 10. At the outer extremity of leg 37, there is located a foot 38 that rests against the upper surface of table 10 to support the outer end of the leg.

Fence 14, the next part of the fence assembly, comprises an elongated body 40 which has slots 41 formed in the two adjoining sides 42 and 43, as shown in FIG. 4 and flat planar surfaces 45 and 46 which are located opposite the slots 41. As can be seen in FIG. 4, the slots are of greater volume on the interior of body 40 than they are at the throat of the slots 41 defined by the walls 42 and 43. This is done so that the mounting mechanism, here shown as a piece of plate stock 44, can be used to secure fence 14 to fence carrier subassembly 12 by means of fasteners 47.

The difference in the height of the two surfaces against which the workpieces are to be pressed during passage through the cutting zone provide a flexibility that is not possible with ordinary fences. For example, in the configuration shown in FIG. 4 with the short side being assembled for use, it is possible to elevate the fence slightly so that the surface 45 does not touch the surface of table 10. When it is aligned this way, the saw can be used for trimming operations on laminated sheet material such as those used in cabinet making. On the other hand, on pieces of more substantial dimensions, then the fence can be turned around so that the surface 45 is the vertical surface which will provide a greater planar surface for use when articles of greater bulk are being sawed.

Returning to FIGS. 5, 6 and 7 of the drawings, it can be seen that the locking mechanism 13 is mounted in the front wall of the base portion 30 of fence carrier subassembly 12. The locking mechanism is held in by means of the internally threaded set screws 50. The locking mechanism comprises a locking element 51 which is located on the inside of the elongated guide rail to the rear of the back sides of the guide rail front walls 22. The locking element 51 is shaped generally like a parallelogram (see FIG. 6) in which the long and short sides enclose obtuse and acute angles. The ends of the locking element 51 that enclose the acute angle are truncated to provide easier operation when the locking element is moved between the locking position shown in FIG. 6 and the unlocking position in which it would be located in a horizontal position with respect to the slot 25. An operating shaft is connected at one end to the locking element 51 and extends outwardly through the slot in front wall 22 to the exterior of the guide rail 11 and also completely through the front wall 32 of base portion 30. The outer end of operating shaft 52 is provided with a tang portion 53 into which is inserted an operating handle 54 which is pinned by means of the pin 55 to the tang 53.

It can be seen from the drawings that the operating handle 54 is provided with an arcuate or curved portion 62. This curved surface 62 is designed to coact with a bearing surface on the front of wall 32 to effect axial movement of operating shaft 52. Specifically, when the operator handle is moved to a generally horizontal postion, the locking element 51 is not forced against the back surfaces of walls 22 so that it is free to be rotated to a horizontal position. In the horizontal position, the thickness of locking element 51 is less than the thickness of slot 25 so that the entire fence and fence carrier subassembly can be removed from the table. This permits removal of the entire fence assembly from the table of the saw without requiring it to be slid all the way down the table and out the end of guide rail 11. Conversely, when the locking element 51 is rotated to the position shown in Figue 6, the operator handle can then be moved downwardly as shown in FIG. 5 so that the cam surface 62 pulls shaft 52 outwardly and draws locking element 51 into locking engagement with the rear surfaces of front wall 22.

It is apparent that other and further forms of the invention may be desired without departing from the spirit and scope of the appended claims and such other and further forms are considered to be within the purview and scope of this invention.

I claim:

1. A fence apparatus for use on a tilting arbor table saw having a circular blade comprising:
   (a) an elongated guide rail having:
      (i) a rear wall for attaching said guide rail to the saw table;
      (ii) an upper wall extending substantially horizontally outwardly from said rear wall away from the saw table;
      (iii) a bottom wall extending substantially horizontally outwardly from said rear wall away from the saw table; and (ix) a pair of spaced apart walls extending inwardly toward each other generally normal to said upper and lower walls to define between them a front wall with a slot extending along at least a portion of the length of said guide rail;

(b) fence carrier means for mounting a fence for movement laterally toward and away from the saw blade, said carrier means including:

(i) an elongated base portion having an upper wall mounted in sliding engaement with said upper wall of said guide rail and a front wall mounted in sliding engagement with the front wall of said guide rail; and (ii) a fence receiving portion extending outwardly from said base portion in a direction substantially normal thereto;

(c) a fence attached to said fence receiving portion; and (d) locking means mounted for rotational movement on said front wall of said fence carrier means, said locking means including:

(i) a locking element located on the inside of said slot in said front wall of said guide rail;

(ii) an operating shaft connected to said locking element and extending outward through said slot;

(iii) an operating handle connected to said operating shaft; and means for fastening said locking element, said shaft, and said handle together including means for effecting a linear movement of said shaft and said element with respect to said front wall of said guide rail to move said locking element between locking and unlocking positions and means for preventing rotation of said shaft and said element with respect to said handle to allow for movement of said locking element to a position for removal and installation throughout said slot.

2. Fence apparatus for a table saw having a circular blade, said table saw having a work table, said apparatus comprising:

an elongated guide rail attached to said work table, said guide rail having a pair of spaced apart first front walls defining a slot therebetween;

a fence;

means for carrying said fence for movement of said fence toward and away from said blade, including a base portion for sliding along said guide rail; and means for locking said fence carrying means to said first front walls, said locking means including an elognated lock element and means extending through said slot for effecting linear and arcuate movement of said lock element with respect to said guide rail between a first position in locking engagement with said first front walls and a second position in line with said slot, said lock element in said second position being moveable through said slot between said first front walls whereby said effecting means provides for installation, locking, and removal of said fence carrying means with respect to said guide rail.

3. Fence apparatus in accordance with claim 2 wherein said guide rail includes a rear wall attached to said saw table, an upper wall extending horizontally outwardly from said rear wall away from the saw table, and a lower wall extending substantially horizontally outwardly from said rear wall away from the saw table, said guide rail further including said first front walls extending inwardly toward each other generally normal to said upper and lower walls to define said slot between them, said lock element including long and short sides which intersect to form generally a parallelogram, said short sides being approximately parallel to said upper and bottom walls in said first position, said long sides being approximately parallel to said upper and bottom walls in said second position.

4. Apparatus in accordance with claim 2 wherein said effecting means includes a shaft connected to said lock element and extending outwardly through said slot, and a handle connected to said shaft, said base portion of said fence carrying means including a front wall with an opening therethrough for receiving said shaft for rotatable and slideable motion, said handle having an arcuate portion, said effecting means including means for pivotally attaching said handle to said shaft so that said arcuate portion coacts with said front wall of said base portion of said fence carrying means to cam said lock element against said front wall of said guide rail.

5. A method for using fence apparatus on a tilting arbor table saw having a circular blade, said table saw having a work table, said fence apparatus including an elongated guide rail attached to said work table, said guide rail having an open interior and a front wall with a slot therein, said fence apparatus further having a fence and means for carrying said fence, said fence carrying means including a base portion and means for receiving said fence, said fence apparatus still further including means for locking said fence carrying means to said guide rail, said locking means including a lock element with long and shorter sides for fitting inside said guide rail, said locking means further including an operating shaft connected to said lock element and an operating handle connected to said operating shaft, said method comprising the steps of:

moving the long sides of said lock element substantially parallel with the slot in said guide rail;

moving said apparatus so that said lock element moves through the slot in said guide rail;

rotating said handle so that the shorter sides of said lock element are substantially parallel with the slot in said guide rail; and moving said handle so that said shaft moves linearly outwardly away from said guide rail to engage said lock element against the front wall of said guide rail thereby locking said apparatus in place.

6. The method of claim 5 including the steps of: removing said fence from said fence carrying means; rotating said fence 90 degrees; and reattaching said fence to said fence carrying means.

* * * * *

UNITED STATES PATENT AND TRADEMARK OFFICE
CERTIFICATE OF CORRECTION

PATENT NO. : 4,600,184
DATED : July 15, 1986
INVENTOR(S) : Steven W. Ashworth

It is certified that error appears in the above-identified patent and that said Letters Patent is hereby corrected as shown below:

Column 1, line 53, "permittng" should be --permitting--.

Column 2, line 47, "specically" should be --specifically--.

Column 3, line 10, rail "22" should be rail --11--.

Column 3, line 35, after "base" delete "member" and insert therefor --portion--.

Column 3, line 35, after "receiving" delete "portion" and insert therefor --member--.

Column 5, line 10, delete "engaement" and insert --engagement--.

Signed and Sealed this

Twenty-third Day of December, 1986

Attest:

DONALD J. QUIGG

Attesting Officer

Commissioner of Patents and Trademarks